United States Patent
Kim et al.

(10) Patent No.: US 8,398,893 B2
(45) Date of Patent: Mar. 19, 2013

(54) HALOPHOSPHATE PHOSPHORS AND METHOD OF PREPARING THE SAME

(75) Inventors: Young-sic Kim, Seoul (KR); Jae-ho Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 508 days.

(21) Appl. No.: 12/695,618

(22) Filed: Jan. 28, 2010

(65) Prior Publication Data
US 2010/0219742 A1 Sep. 2, 2010

(30) Foreign Application Priority Data
Mar. 2, 2009 (KR) .................. 10-2009-0017771

(51) Int. Cl.
*C09K 11/73* (2006.01)

(52) U.S. Cl. .......... 252/301.4 P; 252/301.4 H; 313/503; 313/486; 257/98

(58) Field of Classification Search ............ 252/301.4 P, 252/301.4 H; 313/503, 486; 257/98
See application file for complete search history.

(56) References Cited

U.S. PATENT DOCUMENTS

| | | | |
|---|---|---|---|
| 3,513,103 A | * | 5/1970 | Shaffer .................. 252/301.4 P |
| 4,038,204 A | * | 7/1977 | Wachtel .................. 252/301.4 P |
| 6,759,804 B2 | * | 7/2004 | Ellens et al. .................. 313/512 |
| 2009/0002603 A1 | * | 1/2009 | Otsuka et al. .................. 349/69 |

FOREIGN PATENT DOCUMENTS

| | | | |
|---|---|---|---|
| EP | 1876654 | * | 1/2008 |
| JP | 2269793 A | | 11/1990 |
| JP | 441585 A | | 2/1992 |
| JP | 570774 A | | 3/1993 |
| JP | 200770388 A | | 3/2007 |
| JP | 200859946 A | | 3/2008 |
| JP | 2000212556 A | | 8/2012 |
| KR | 1020080081054 A | | 9/2008 |
| WO | WO 2007/074935 | * | 7/2007 |

* cited by examiner

*Primary Examiner* — Carol M Koslow
(74) *Attorney, Agent, or Firm* — Cantor Colburn LLP

(57) ABSTRACT

A method of preparing a halophosphate phosphor represented by Formula 1, the method comprising: mixing a metallic precursor compound, which comprises strontium pyrophosphate, strontium chloride and strontium carbonate, and an activator precursor compound to form a mixture; sintering the mixture under an oxygen or air atmosphere to form a sintered mixture; milling the sintered mixture to form a milled product, and sintering the milled product under a reducing atmosphere:

$$(Sr_{5-(x+y)}A_xM'_y)(PO_4)_3Cl.(M_2O_3)_z \qquad \text{Formula 1}$$

wherein A is barium or calcium, M' is an activator and comprises at least one cation selected from the group consisting of $Eu^{2+}$, $Mn^{2+}$, $Sb^{2+}$, $Ce^{3+}$, $Pr^{3+}$, $Nd^{3+}$, $Sm^{3+}$, $Tb^{3+}$, $Dy^{3+}$, $Ho^{3+}$, $Er^{3+}$, $Yb^{3+}$ and $Bi^{3+}$, M is aluminum, yttrium or lanthanum, $0 \leq x \leq 4.8$, $0 < y \leq 0.2$, and $0 \leq z < 0.1$.

17 Claims, 5 Drawing Sheets

HALOPHOSPHATE PHOSPHORS AND METHOD OF PREPARING THE SAME

CROSS-REFERENCE TO RELATED APPLICATIONS

This application claims priority to Korean Patent Application No. 10-2009-0017771, filed on Mar. 2, 2009, and all the benefits accruing therefrom under 35 U.S.C. §119, the content of which in its entirety is herein incorporated by reference.

BACKGROUND

1. Field

One or more embodiments relate to a halophosphate phosphor having high brightness and a method of preparing the same, and more particularly, to a strontium halophosphate phosphor having high brightness and high stability, and a method of preparing the same.

2. Description of the Related Art

Cold cathode fluorescent lamps ("CCFLs") are widely used as a backlight for liquid crystal displays ("LCDs"). As techniques related to light emitting diodes ("LEDs") are developed, there remains a need for improved CCFL phosphors having improved brightness or color gamut. In this regard, a wide color gamut CCFL, whereby a conventional color gamut is widened to provide a wider range of color, is of current interest. However, it is difficult to manufacture phosphors having both a wide color gamut and high brightness.

In addition, when phosphors are applied to CCFLs, improved phosphor stability is desirable because mercury is adsorbed by the phosphors, which can lead to phosphor instability. To solve the adsorption phenomenon, trivalent metal oxides such as $Al_2O_3$, $Y_2O_3$ or $La_2O_3$ are mixed with and attached to the phosphors, thereby preventing adsorption of mercury. However, the trivalent metal oxide particles are non-uniformly distributed on the surface of phosphors and are easily separated from the phosphors. Thus, use of such trivalent metal oxide particles does not achieve the desired phosphor protection function.

Accordingly, in order to obtain wide-color gamut CCFLs, there remains a need for a phosphor having high brightness, a deep blue color coordinate and improved stability.

In addition, when phosphors are applied to light emitting devices, in order to manufacture an improved light emitting device having excellent color gamut and improved rendering characteristics, there remains a need for a phosphor having improved brightness and stability.

SUMMARY

One or more embodiments include a halophosphate phosphor having high brightness and high stability.

One or more embodiments include a method of preparing the halophosphate phosphor.

One or more embodiments include a cold cathode fluorescence lamp ("CCFL") including the halophosphate phosphor.

One or more embodiments include a light emitting device including a light emitting diode and a halophosphate phosphor.

Additional aspects, features and advantages will be set forth in the description which follows.

To achieve the above and/or other aspects, features or advantages, one or more embodiments includes a method of preparing a halophosphate phosphor represented by Formula 1. The method comprises: mixing a metallic precursor compound, which comprises strontium pyrophosphate, strontium chloride and strontium carbonate, and an activator precursor compound to form a mixture; sintering the mixture under an oxygen or air atmosphere to form a sintered mixture; milling the sintered mixture to form a milled product; and sintering the milled product under a reducing atmosphere:

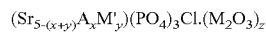  Formula 1

$(Sr_{5-(x+y)}A_xM'_y)(PO_4)_3Cl\cdot(M_2O_3)_z$ wherein
A is barium (Ba) or calcium (Ca),
M' is an activator and comprises at least one cation selected from the group consisting of $Eu^{2+}$, $Mn^{2+}$, $Sb^{2+}$, $Ce^{3+}$, $Pr^{3+}$, $Nd^{3+}$, $Sm^{3+}$, $Tb^{3+}$, $Dy^{3+}$, $Ho^{3+}$, $Er^{3+}$, $Yb^{3+}$ and $Bi^{3+}$,
M is aluminum (Al), yttrium (Y) or lanthanum (La),
$0 \leq x \leq 4.8$,
$0 < y \leq 0.2$, and
$0 \leq z < 0.1$.

According to an embodiment, in the mixing, the metallic precursor compound may further comprise a barium or calcium precursor compound.

According to an embodiment, the method may further comprise adding at least one compound selected from the group consisting of a lanthanum precursor compound, an yttrium precursor compound and an aluminum precursor compound to the milled product prior to the sintering of the milled product.

According to an embodiment, the method may further comprise adding at least one flux selected from the group consisting of $NH_4Cl$, $BaCl_2$ and $CaCl_2$ during the mixing.

According to an embodiment, the reducing atmosphere may comprise a gaseous mixture comprising hydrogen and nitrogen.

According to an embodiment, the mixture may be sintered at a temperature of about 500 to about 900° C. for about 1 to about 5 hours.

According to an embodiment, the milled product may be sintered at a temperature of about 1000 to about 1400° C. for about 1 to about 10 hours.

According to an embodiment, a size of the at least one compound selected from the group consisting of the lanthanum precursor compound, the yttrium precursor compound and the aluminum precursor compound may be in the range of about 1 to about 100 nanometers (nm).

According to an embodiment, the amount of the activator precursor compound may be in the range of about 1 to about 20 mole percent, based on the total moles of the strontium pyrophosphate, the strontium chloride and the strontium carbonate.

According to an embodiment, the strontium chloride may be in an amount such that an excess of chloride ions is about 1 to about 50 percent (%), based on a theoretical amount of chloride ions.

According to an embodiment, the amount of the at least one compound selected from the group consisting of the lanthanum precursor compound, the yttrium precursor compound and the aluminum precursor compound may be in the range of about 0.001 to about 1 part by weight, based on 100 parts by weight of the mixture comprising the metallic precursor compound and the activator precursor compound.

According to an embodiment, the amount of the flux may be in the range of about 0.001 to about 5 parts by weight, based on 100 parts by weight of the mixture comprising the metallic precursor compound and the activator precursor compound.

The method may further comprise milling, washing, drying and classifying the sintered milled product.

To achieve the above and/or other aspects, features or advantages, one or more embodiments includes a halophosphate phosphor represented by Formula 1:

$$(Sr_{5-(x+y)}A_xM'_y)(PO_4)_3Cl.(M_2O_3)_z \quad \text{Formula 1}$$

wherein

A is barium or calcium,

M' is an activator and comprises at least one cation selected from the group consisting of $Eu^{2+}$, $Mn^{2+}$, $Sb^{2+}$, $Ce^{3+}$, $Pr^{3+}$, $Nd^{3+}$, $Sm^{3+}$, $Tb^{3+}$, $Dy^{3+}$, $Ho^{3+}$, $Er^{3+}$, $Yb^{3+}$ and $Bi^{3+}$, M is aluminum, yttrium or lanthanum, $0 \leq x \leq 4.8$, $0 < y \leq 0.2$, and $0 \leq z < 0.1$, wherein the halophosphate phosphor is prepared by the method of claim 1.

To achieve the above and/or other aspects, one or more embodiments includes a cold cathode fluorescence lamp including the halophosphate phosphor described above.

To achieve the above and/or other aspects, one or more embodiments includes a light emitting device including: a light emitting diode; and a halophosphate phosphor, represented by Formula 1:

$$(Sr_{5-(x+y)}A_xM'_y)(PO_4)_3Cl.(M_2O_3)_z \quad \text{Formula 1}$$

wherein A is barium or calcium, M' comprises at least one cation selected from the group consisting of $Eu^{2+}$, $Mn^{2+}$, $Sb^{2+}$, $Ce^{3+}$, $Pr^{3+}$, $Nd^{3+}$, $Sm^{3+}$, $Tb^{3+}$, $Dy^{3+}$, $Ho^{3+}$, $Er^{3+}$, $Yb^{3+}$ and $Bi^{3+}$, M is aluminum, yttrium or lanthanum, $0 \leq x \leq 4.8$, $0 < y \leq 0.2$, and $0 \leq z < 0.1$, wherein the halophosphate phosphor is prepared by a method comprising mixing a metallic precursor compound, which comprises strontium pyrophosphate, strontium chloride and strontium carbonate, and an activator precursor compound to form a mixture; sintering the mixture under an oxygen or air atmosphere to form a sintered mixture; milling the sintered mixture to form a milled product; and sintering the milled product under a reducing atmosphere.

Disclosed is a cold cathode fluorescent lamp comprising a halophosphate phosphor represented by Formula 1:

$$(Sr_{5-(x+y)}A_xM'_y)(PO_4)_3Cl.(M_2O_3)_z \quad \text{Formula 1}$$

wherein A is barium or calcium, M' comprises at least one cation selected from the group consisting of $Eu^{2+}$, $Mn^{2+}$, $Sb^{2+}$, $Ce^{3+}$, $Pr^{3+}$, $Nd^{3+}$, $Sm^{3+}$, $Tb^{3+}$, $Dy^{3+}$, $Ho^{3+}$, $Er^{3+}$, $Yb^{3+}$ and $Bi^{3+}$, M is aluminum, yttrium or lanthanum, $0 \leq x \leq 4.8$, $0 < y \leq 0.2$, and $0 \leq z < 0.1$, wherein the halophosphate phosphor is prepared by a method comprising mixing a metallic precursor compound, which comprises strontium pyrophosphate, strontium chloride and strontium carbonate, and an activator precursor compound to form a mixture; sintering the mixture under an oxygen or air atmosphere to form a sintered mixture; milling the sintered mixture to form a milled product; and sintering the milled product under a reducing atmosphere

BRIEF DESCRIPTION OF THE DRAWINGS

These and/or other aspects will become apparent and more readily appreciated from the following description of the embodiments, taken in conjunction with the accompanying drawings, in which.

DETAILED DESCRIPTION

Figure 1:
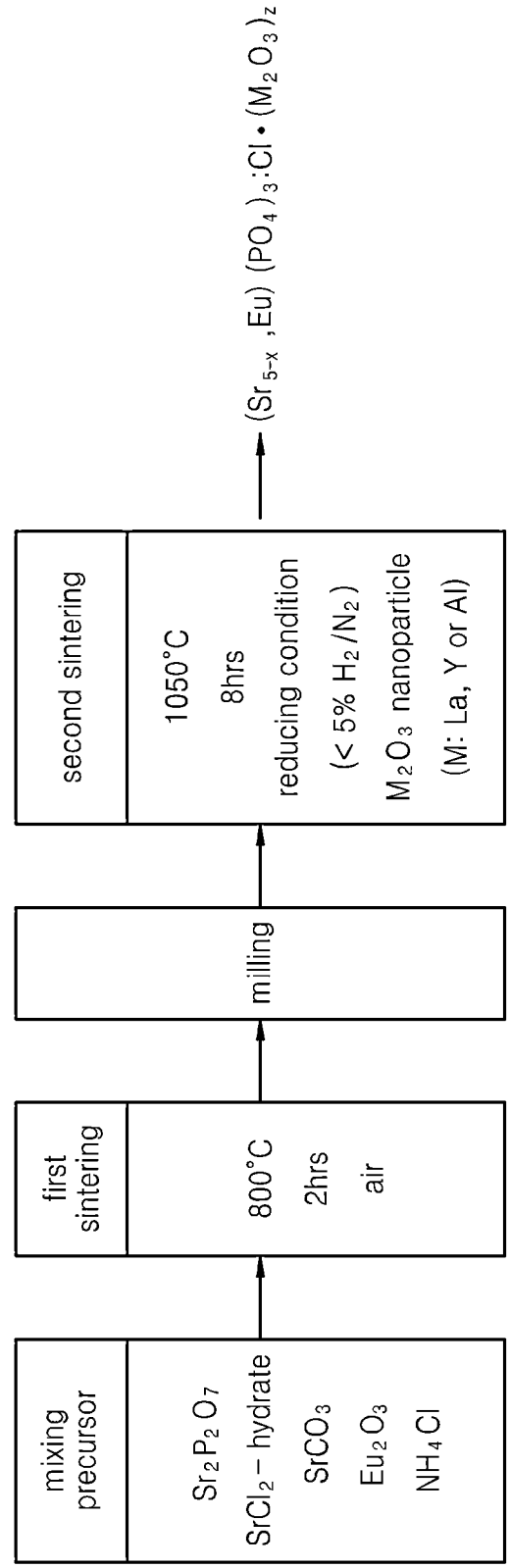
FIG. 1 is a schematic diagram illustrating an exemplary embodiment of a method of preparing a halophosphate phosphor.

Reference will now be made in detail to embodiments, examples of which are illustrated in the accompanying drawings. In this regard, the present embodiments may have different forms and should not be construed as being limited to the descriptions set forth herein. Accordingly, the embodiments are merely described below, by referring to the figures, to explain aspects of the present description.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a halophosphate phosphor according to an embodiment, a method of preparing the same, a cold cathode fluorescence lamp ("CCFL") including the halophosphate phosphor and a light emitting device including the halophosphate phosphor will be described in further detail. Herein a group of elements separated by commas in a set of parentheses represents elements that are interchangeable at the same site.

According to an embodiment, a method of preparing a halophosphate phosphor represented by Formula 1 is provided, wherein the method comprises: mixing a metallic precursor compound that comprises strontium pyrophosphate, strontium chloride and strontium carbonate, and an activator precursor compound to form a mixture; sintering the mixture under an oxygen or air atmosphere; milling the sintered mixture to form a milled product, and sintering the milled product under a reducing atmosphere:

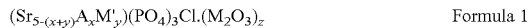

$$(Sr_{5-(x+y)}A_xM'_y)(PO_4)_3Cl.(M_2O_3)_z \quad \text{Formula 1}$$

wherein A is barium (Ba) or calcium (Ca), M' is an activator and comprises at least one cation selected from the group consisting of $Eu^{2+}$, $Mn^{2+}$, $Sb^{2+}$, $Ce^{3+}$, $Pr^{3+}$, $Nd^{3+}$, $Sm^{3+}$, $Tb^{3+}$, $Dy^{3+}$, $Ho^{3+}$, $Er^{3+}$, $Yb^{3+}$ and $Bi^{3+}$, M is aluminum (Al), yttrium (Y) or lanthanum (La), $0 \leq x \leq 4.8$, $0 < y \leq 0.2$, and $0 \leq z < 0.1$.

According to an embodiment, in the mixing, the metallic precursor compound may further comprise a barium or calcium precursor compound. In addition, the method may further comprise, after the sintered mixture is milled and before the milled product is sintered, adding at least one compound selected from the group consisting of a lanthanum, an yttrium and an aluminum precursor compound to the milled product.

While not wanting to be bound by theory, it is believed that when a sintering process is performed once, a reaction occurs after source materials are transformed into oxides in the sintering process. In the sintering process, chloride ions in strontium chloride and hydrogen gas form a hydrogen chloride gas and thus the amount of available chloride ions changes. Thus, a stoichiometric excess of strontium chloride is desirable when sintering is performed once. However, when sintering is performed twice according to an embodiment, a reaction wherein the amount of available chloride ions is relatively stable occurs, and thus use of an excess of chloride ions may be omitted. When an excess of chloride ions is used, excess gas is discharged in the sintering process and thus environmental pollution may occur and additionally, the lifetime of the sintering apparatus may be reduced. That is, when a sintering process is performed once, the strontium chloride may be used in an amount that provides an excess of chloride ions of about 80 to about 120 percent ("%"), specifically about 90 to about 110%, specifically about 100%, based on a theoretical amount of chloride ions. However, according to an embodiment, the strontium chloride may be used in an amount that provides an excess of chloride ions of about 1 to about 50%, specifically about 2% to about 40%, more specifically about 4% to about 30%, based on a theoretical amount of chloride ions. In addition, the strontium chloride may be used in a hydrate form.

In the mixing, the amount of the activator precursor compound may be in the range of about 1 to about 20 mole percent (mol %), specifically about 2 to about 15 mol %, more specifically about 4 to about 10 mol % based on the total moles of the total strontium compounds, comprising strontium pyrophosphate, strontium chloride and strontium carbonate. If the amount of the activator precursor compound is less than about 1 mol %, based on the total moles of the total strontium elements, the synthesized halophosphate phosphor may have low brightness. On the other hand, if the amount of the activator precursor compound is greater than about 20 mol %, based on the total moles of the total strontium elements, a concentration quenching phenomenon may occur and the synthesized halophosphate phosphor may have low brightness.

In the mixing process, at least one type of flux selected from the group consisting of $NH_4Cl$, $BaCl_2$, $CaCl_2$ and the like may be further added. In this regard, the amount of the flux used may be in the range of about 0.001 to about 5 parts by weight, specifically about 0.01 to about 4 parts by weight, more specifically about 0.1 to about 1 parts by weight, based on 100 parts by weight of the mixture comprising the metallic precursor compound and the activator precursor compound. If the amount of the flux used is less than about 0.001 parts by weight, based on 100 parts by weight of the total reactants, the brightness improvement effect of the halophosphate phosphor may be negligible. On the other hand, if the amount of the flux used is greater than about 5 parts by weight, based on 100 parts by weight of the total reactants, the synthesized particles may have a rough surface or have a non-uniform size distribution.

The resultant mixture is sintered under an oxygen or air atmosphere. The sintering process may be performed at a temperature of about 500 to about 900° C., specifically at about 700 to about 900° C., more specifically at about 800° C. for about 0.1 to about 50 hours, specifically for about 1 to about 5 hours, more specifically for about 2 hours.

Since the sintering process is performed in an oxygen or air atmosphere and a strontium pyrophosphate particle precursor is used, a $Sr_{5-(x+y)}A_xM'_y(PO_4)_3Cl$ phosphor may be effectively prepared.

In addition, by further adding $NH_4Cl$, $BaCl_2$, $CaCl_2$ or the like as a flux, the flux is evaporated or decomposed at low temperature and thus may be present in a gaseous form such as HCl, and thus reactivity of the metallic precursor compound is also increased and the entire composition becomes uniform.

The mixture may have a uniform composition distribution. The mixture is milled and then sintered under a reducing atmosphere at a temperature of about 1000 to about 1400° C., specifically at about 1000 to about 1100° C., more specifically at about 1050° C. for about 0.1 to about 50 hours, specifically for about 1 to about 10 hours, more specifically for about 5 hours, thereby increasing the crystallinity of the milled product and reducing the activator precursor compound, thereby preparing a halophosphate phosphor.

At least one compound selected from the group consisting of a lanthanum, an yttrium and an aluminum precursor compound may be further added to the milled and sintered product and then a sintering process is performed thereon. The amount of the at least one compound selected from the group consisting of a lanthanum, an yttrium and an aluminum precursor compound may be about 0.001 to about 1 part by weight, specifically about 0.01 to about 0.1 part by weight, more specifically about 0.05 part by weight, based on 100 parts by weight of the mixture comprising the metallic precursor compound and the activator precursor compound. If the amount of the at least one compound selected from the group consisting of a lanthanum, an yttrium and an aluminum precursor compound is less than about 0.001 parts by weight, based on 100 parts by weight of the mixture comprising the metallic precursor compound and the activator precursor compound, the synthesized halophosphate phosphor may not be sufficiently protected. On the other hand, if the amount of the at least one compound selected from the group consisting of a lanthanum, an yttrium and an aluminum precursor compound is greater than about 1 part by weight based on 100 parts by weight of the mixture comprising the metallic precursor compound and the activator precursor compound, the brightness of the halophosphate phosphor may be reduced.

The lanthanum, yttrium and aluminum precursor compounds may be an oxide, chloride, nitrate, acetate, carbonate, hydrate, sulfate or the like. According to an embodiment, the lanthanum, yttrium and aluminum precursor compounds may be lanthanum oxide, yttrium oxide and aluminum oxide, respectively. Each of the lanthanum, yttrium and aluminum precursor compounds may have a particle size of about 1 to about 100 nanometers (nm), specifically about 5 to about 90 nm, more specifically about 50 nm. While not wanting to be bound by theory, the additionally used lanthanum, yttrium and aluminum precursor compound nanoparticles may react with a crystalline $Sr_{5-(x+y)}A_xM'_y(PO_4)_3Cl$ prepared in advance in the previous sintering process and thus may be present in the form of an oxide having the general formula $M_2O_3$, and may be on the surface of or inside the crystal, thereby protecting the halophosphate phosphor. In addition, since the lanthanum, yttrium and aluminum precursor compound nanoparticles used have a relatively small size, the lanthanum, yttrium and aluminum precursor compound nanoparticles have a high surface reactivity, thus impurities present in the crystal are attached to the lanthanum, yttrium and aluminum precursor compound nanoparticles and are pushed toward the surface of the crystal. Therefore a self-refinement effect may be obtained. Furthermore, the lanthanum, yttrium and aluminum precursor compound nanoparticles are mixed with other components when the halophosphate phosphor is manufactured, not after the halophosphate phosphor is manufactured, and thus the lanthanum, yttrium and aluminum precursor compound nanoparticles may not be easily separated from the surface of the crystal. In an embodiment, the lanthanum, yttrium and aluminum precursor compound is bonded to the surface of the $Sr_{5-(x+y)}A_xM'_y(PO_4)_3Cl$.

The reducing atmosphere may be a hydrogen and nitrogen-containing gaseous mixture. In this regard, the hydrogen and nitrogen-containing gaseous mixture may comprise about 0.1 to about 5 volume percent (vol %), specifically about 1 to about 4 vol %, more specifically about 2 vol % of hydrogen and about 95 to about 99.9 vol %, specifically about 97 to about 99 vol %, more specifically about 98 vol % of nitrogen.

Sintering is performed twice as described above. The first sintering is performed to facilitate crystal growth while removing moisture, organic materials or complexes of some salts from the resultant mixture. If the first sintering temperature is at a temperature lower than about 500° C., the crystal may not be formed. On the other hand, if the first sintering temperature is at a temperature higher than about 900° C., one or more components of the resultant mixture may be sublimated and thus a stoichiometric ratio may be changed or unreacted materials may be present in the resultant mixture and thus crystallinity of the final phosphor may be degraded and the wavelength conversion efficiency of the halophosphate phosphor may be reduced.

If the second sintering process is at a temperature lower than about 1000° C., the synthesis reaction may not occur and thus a desired brightness intensity level may not be obtained. On the other hand, if the second sintering process temperature is higher than about 1400° C., it may be difficult to a control particle diameter of a target product or the distribution of the particle diameters and thus, a halophosphate phosphor powder having desired characteristics may not be obtained.

The method of preparing the halophosphate phosphor may further comprise, after the sintering of the milled product, milling, washing, drying and classifying the sintered milled product.

FIG. 1 is a schematic diagram illustrating an exemplary embodiment of a method of preparing a halophosphate phosphor. In the method, $Sr_2P_2O_7$, $SrCl_2$-hydrate and $SrCO_3$, as metallic precursor compounds, $Eu_2O_3$ as an activator precursor compound and $NH_4Cl$, as a flux, are mixed. The resulting mixture is sintered at about 500 to about 900° C., specifically at about 700 to about 900° C., more specifically at about 800° C. for about 0.1 hour to about 10 hours, specifically for about 1 hour to about 4 hours, more specifically for about 2 hours under an air atmosphere. The obtained sintered product is milled and then $M_2O_3$ nanoparticles, wherein M is La, Y or Al, are added thereto and the resulting mixture is sintered under a reducing atmosphere comprising about 2 vol % $H_2$ and about 98 vol % $N_2$ at a temperature of about 1000 to about 1400° C., specifically at about 1000 to about 1100° C., more specifically at about 1050° C. for about 1 to about 20 hours, specifically for about 2 to about 10 hours, more specifically for about 8 hours, thereby obtaining $(Sr_{5-x}Eu_x)(PO_4)_3:Cl \cdot (M_2O_3)_z$.

Another embodiment provides a halophosphate phosphor represented by Formula 1 prepared using the method described above.

The halophosphate phosphor may be used in a CCFL or other light emitting device. If the halophosphate phosphor includes $M_2O_3$ at its surface, $M_2O_3$ may act as a protecting material and thus when used in a CCFL, a decrease in phosphor performance that is caused when mercury is adsorbed onto the phosphor may be substantially prevented or effectively eliminated.

Another embodiment provides a light emitting device that comprises a light emitting diode ("LED") and the halophosphate phosphor.

In the light emitting device, the light emitting diode may be a blue or ultraviolet ("UV") LED, and a peak wavelength band of an excited light source may be in the range of about 360 to about 470 nm.

In the light emitting device, the peak wavelength band of the halophosphate phosphor may be in the range of about 440 to about 460 nm.

The light emitting device may further comprise at least one phosphor selected from the group consisting of a blue phosphor, a green phosphor and a red phosphor.

Examples of the blue phosphor include $BaMg_2Al_{16}O_{27}:Eu^{2+}$; $Sr_4Al_{14}O_{25}:Eu^{2+}$; $BaAl_8O_{13}:Eu^{2+}$; $BaMgAl_{10}O_{17}:Eu^{2+}$; $Sr_2Si_3O_8 \cdot 2SrCl_2:Eu^{2+}$; $Ba_3MgSi_2O_8:Eu^{2+}$; $(Sr,Ca)_{10}(PO_4)_6(nB_2O_3:Eu^{2+})$; or the like or combinations thereof.

Examples of the green phosphor include $(Ba,Sr,Ca)_2SiO_4:Eu^{2+}$; $Ba_2MgSi_2O_7:Eu^{2+}$; $Ba_2ZnSi_2O_7:Eu^{2+}$; $BaAl_2O_4:Eu^{2+}$; $SrAl_2O_4:Eu^{2+}$; $BaMgAl_{10}O_{17}:Eu^{2+}, Mn^{2+}$; $BaMg_2Al_{16}O_{27}:Eu^{2+},Mn^{2+}$; or the like or combinations thereof.

Examples of the red phosphor include $(Ba,Sr,Ca)_2Si_5N_8$: $Eu^{2+}$; $(Sr,Ca)AlSiN_3$:$Eu^{2+}$; $Y_2O_3$:$Eu^{3+},Bi^{3+}$; $(Ca,Sr)S$:$Eu^{2+}$; $CaLa_2S_4$:$Ce^{3+}$; $(Sr,Ca,Ba)_2P_2O_7$:$Eu^{2+},Mn^{2+}$; $(Ca,Sr)_{10}(PO_4)_6$ $(F,Cl)$:$Eu^{2+},Mn^{2+}$; $(Y,Lu)_2WO_6$:$Eu^{3+},Mo^{6+}$; $(Gd,Y,Lu,La)_2O_3$:$Eu^{3+},Bi^{3+}$; $(Gd,Y,Lu,La)_2O_2S$:$Eu^{3+},Bi^{3+}$; $(Gd,Y,Lu,La)BO_3$:$Eu^{3+},Bi^{3+}$; $(Gd,Y,Lu,La)(P,V)O_4$:$Eu^{3+},Bi^{3+}$ and $(Ba,Sr,Ca)MgP_2O_7$:$Eu^{2+},Mn^{2+}$; or the like or combinations thereof.

Hereinafter, the embodiments will be described in further detail with reference to the following examples. The following examples are for illustrative purposes only and are not intended to limit the scope of the embodiments.

Example 1

$SrHPO_4$, 350 g, was loaded into an alumina crucible and then heated in a box furnace at a temperature of 900° C. for 2 hours, thereby obtaining 300 g of $Sr_2P_2O_7$. The amounts of $Sr_2P_2O_7$, $SrCl_2\cdot 6H_2O$, $SrCO_3$, and $Eu_2O_3$ were measured to be in a mole ratio of 1.5:0.6 (10% excess): 1.32:0.04 in order to obtain $(Sr_{4.92},Eu_{0.08})(PO_4)_3Cl$, and 0.1 parts by weight of $NH_4Cl$ based on 100 parts by weight of the total reactants was added thereto and mixed. The mixed powder was loaded into an alumina crucible and then heated in a box furnace at a temperature of 800° C. for 2 hours under an air atmosphere. The sintered product was cooled to a temperature of 25° C. and then milled. The milled product was mixed with 1 part by weight of $Y_2O_3$ nanoparticles (particle size of 100 nm) based on 100 parts by weight of the total reactants and then loaded into an alumina crucible and then sintered under a nitrogen atmosphere containing 5 vol % or less hydrogen at a temperature of 1050° C. for 8 hours. Then, the sintered product was milled, washed with distilled water, dried and classified, thereby obtaining halophosphate phosphor powder represented by $(Sr_{4.92},Eu_{0.08})(PO_4)_3Cl\cdot(Y_2O_3)_{0.06}$.

Example 2

Halophosphate phosphor powder represented by the formula $(Sr_{4.92},Eu_{0.08})(PO_4)_3Cl\cdot(La_2O_3)_{0.04}$ was obtained in the same manner as in Example 1, except that 1 part by weight of $La_2O_3$ nanopowder was used instead of $Y_2O_3$ nanopowder.

Example 3

Halophosphate phosphor powder represented by $(Sr_{4.92},Eu_{0.08})(PO_4)_3Cl$ was obtained in the same manner as in Example 1, except that $Y_2O_3$ nanopowder was not used.

The metals content of the halophosphate phosphor powders prepared according to Examples 1-3 were analyzed by inductively coupled plasma ("ICP") mass spectrometry using an ICP (Manufacturer: SHIMADZU, model name: ICPS-8100). The results are shown in Table 1 below.

TABLE 1

|  | Sr | | Eu | | Y | | La | |
| --- | --- | --- | --- | --- | --- | --- | --- | --- |
|  | Weight % | Mole ratio | Weight % | Mole ratio | Weight % | Mole ratio | Weight % | Mole ratio |
| Example 1 | 55.34 | 4.92 | 1.53 | 0.078 | 0.70 | 0.061 | — | — |
| Example 2 | 54.98 | 4.92 | 1.56 | 0.080 | — | — | 0.74 | 0.042 |
| Example 3 | 55.34 | 4.92 | 1.53 | 0.078 | — | — | — | — |

Figure 2:
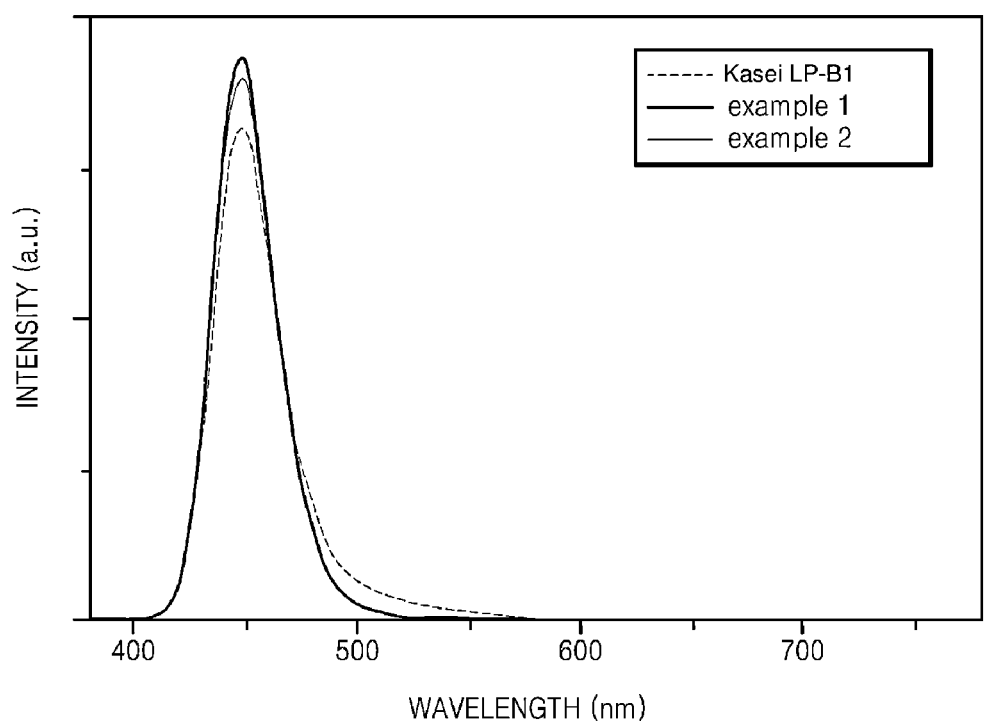
FIG. 2 shows emission spectra of exemplary embodiments of halophosphate phosphors prepared according to Examples 1 and 2 and the commercially available phosphor (Sr,Ca,Ba,Mg)$_{10}$(PO$_4$)$_6$Cl$_2$:Eu (abbreviated as LP-B1) manufactured by KASEI OPTONIX, LTD., when excited at a wavelength of 254 nm.

FIG. 2 shows emission spectra of the halophosphate phosphors prepared according to Examples 1 and 2 at a wavelength of 254 nm. Table 2 shows peak intensity and color coordinate of the halophosphate phosphors prepared according to Examples 1 and 2.

TABLE 2

|  | Peak Intensity (with respect to reference) | CIE x | CIE y |
| --- | --- | --- | --- |
| Example 1 | 115% | 0.1518 | 0.0320 |
| Example 2 | 110% | 0.1518 | 0.0332 |

As is shown in FIG. 2, the peak intensity of the halophosphate phosphors prepared according to Examples 1 and 2 is higher by 10 to 15% than that of the commercially available phosphor (Product name: LP-B1) manufactured by KASEI OPTONIX, LTD. With regard to the color coordinate values, it is seen that the color coordinate of the halophosphate phosphors prepared according to Examples 1 and 2 is shifted to a shorter wavelength, corresponding to deep blue.

Figure 3:
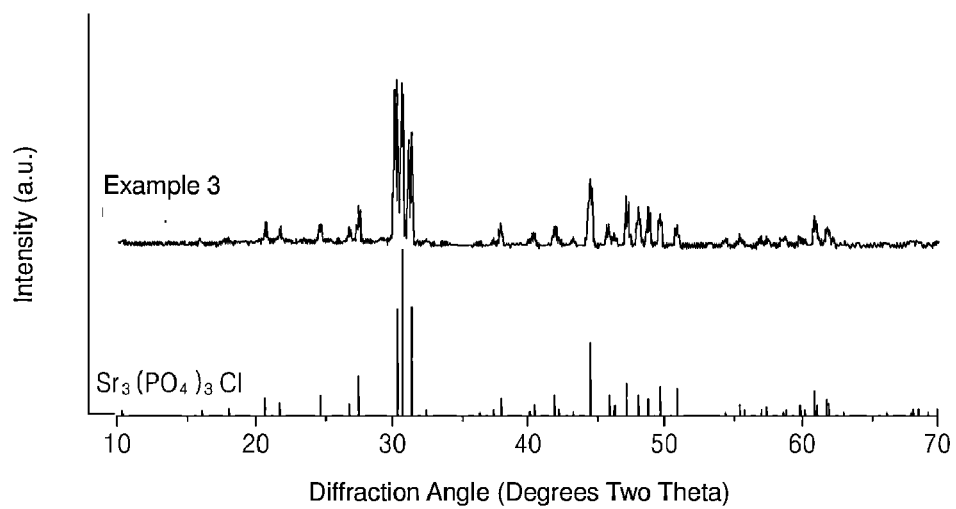
FIG. 3 shows x-ray powder diffraction data ("XRD") of an exemplary embodiment of a halophosphate phosphor powder prepared according to Example 3 and an idealized calculated x-ray powder diffraction pattern for Sr$_3$(PO$_4$)$_3$Cl.

FIG. 3 shows x-ray powder diffraction ("XRD") data of the halophosphate phosphor powder prepared according to Example 3 and an idealized calculated x-ray powder diffraction pattern for $Sr_3(PO_4)_3Cl$. Referring to FIG. 3, it is seen that the additionally used metal ions do not form different compounds and are synthesized into the phase of $Sr_5(PO_4)_3Cl$:Eu.

Figure 4A:
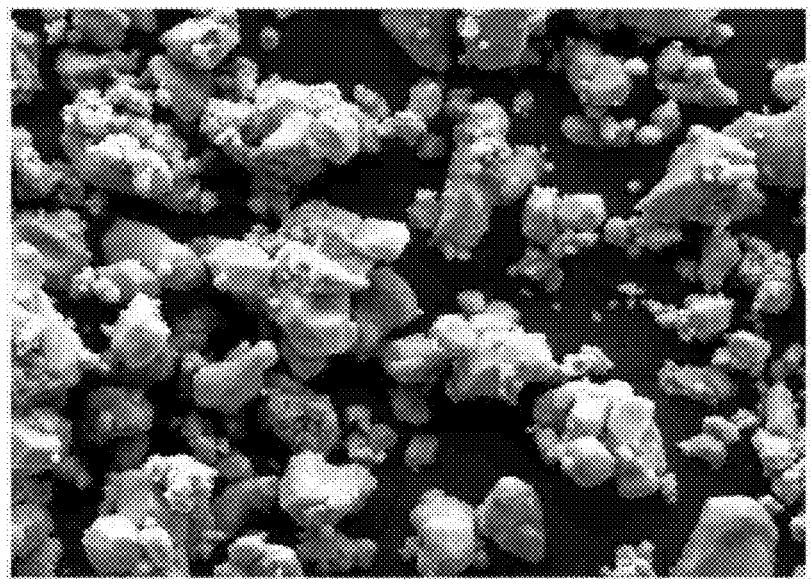
FIGS. 4A and 4B are scanning electron microscopic ("SEM") images of phosphors prepared according to Examples 1 and 2.
Figure 4B:
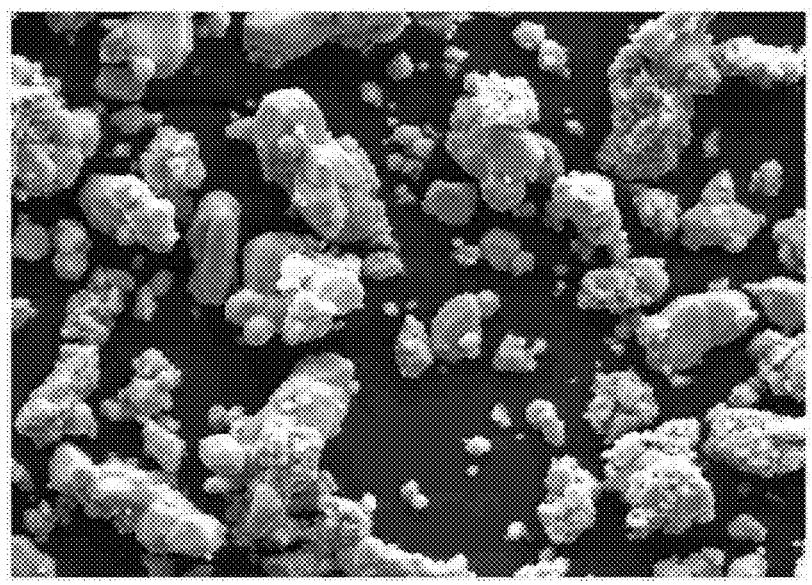
Figure 4C:
FIG. 4C is a SEM image of a commercially available phosphor manufactured by KASEI OPTONIX, LTD.

FIGS. 4A and 4B are scanning electron microscopic ("SEM") images of the halophosphate phosphors prepared according to Examples 1 and 2 and FIG. 4C is a SEM image of the commercially available phosphor manufactured by KASEI OPTONIX, LTD.

As described above, according to the one or more of the foregoing embodiments, halophosphate phosphors having high brightness and high stability, a CCFL that has a wide color gamut characteristic and includes the halophosphate phosphor and a light emitting device including the halophosphate phosphor are provided.

It should be understood that the exemplary embodiments described herein should be considered in a descriptive sense only and not for purposes of limitation. Descriptions of features or aspects within each embodiment should be considered as available for other similar features, advantages or aspects in other embodiments.

What is claimed is:

1. A method of preparing a halophosphate phosphor represented by Formula 1, the method comprising:
   mixing a metallic precursor compound, which comprises strontium pyrophosphate, strontium chloride and strontium carbonate, optionally a metal precursor compound selected from the group consisting of a barium precursor compound, a calcium precursor compound and mixture thereof, and an activator precursor compound to form a mixture;

sintering the mixture under an oxygen or air atmosphere to form a sintered mixture;

optionally mixing the sintered mixture with an aluminum precursor compound, a yttrium precursor compound, a lanthanum precursor compound and mixture thereof;

milling the sintered mixture to form a milled product; and sintering the milled product under a reducing atmosphere:

$$(Sr_{5-(x+y)}A_xM'_y)(PO_4)_3Cl.(M_2O_3)_z \qquad \text{Formula 1}$$

wherein

A is barium or calcium,

M' is an activator and comprises at least one cation selected from the group consisting of $Eu^{2+}$, $Mn^{2+}$, $Sb^{2+}$, $Ce^{3+}$, $Pr^{3+}$, $Nd^{3+}$, $Sm^{3+}$, $Tb^{3+}$, $Dy^{3+}$, $Ho^{3+}$, $Er^{3+}$, $Yb^{3+}$ and $Bi^{3+}$, M is aluminum, yttrium or lanthanum, $0 \leq x \leq 4.8$, $0 < y \leq 0.2$, and $0 \leq z < 0.1$.

2. The method of claim 1, wherein the metallic precursor compound further comprises a barium or calcium precursor compound.

3. The method of claim 1, further comprising adding at least one compound selected from the group consisting of a lanthanum precursor compound, an yttrium precursor compound and an aluminum precursor compound to the milled product prior to the sintering of the milled product.

4. The method of claim 1, further comprising adding at least one flux selected from the group consisting of $NH_4Cl$, $BaCl_2$ and $CaCl_2$ during the mixing.

5. The method of claim 1, wherein the reducing atmosphere comprises a gaseous mixture comprising hydrogen and nitrogen.

6. The method of claim 5, wherein the reducing atmosphere comprises a gaseous mixture comprising about 0.1 to about 5 volume percent hydrogen and about 95 to about 99.9 volume percent nitrogen, based on the total volume of the reducing atmosphere.

7. The method of claim 1, wherein the mixture is sintered at a temperature of about 500 to about 900° C. for about 1 to about 5 hours.

8. The method of claim 1, wherein the milled product is sintered at a temperature of about 1000 to about 1400° C. for about 1 to about 10 hours.

9. The method of claim 3, wherein a size of the at least one compound selected from the group consisting of the lanthanum precursor compound, the yttrium precursor compound and the aluminum precursor compound is in the range of about 1 to about 100 nanometers.

10. The method of claim 1, wherein the amount of the activator precursor compound is in the range of about 1 to about 20 mole percent, based on the total moles of the strontium pyrophosphate, the strontium chloride and the strontium carbonate.

11. The method of claim 1, wherein the strontium chloride is in an amount such that an excess of chloride ions is about 1 to about 50 percent, based on a theoretical amount of chloride ions.

12. The method of claim 3, wherein the amount of the at least one compound selected from the group consisting of the lanthanum precursor compound, the yttrium precursor compound and the aluminum precursor compound is in the range of about 0.001 to about 1 part by weight, based on 100 parts by weight of the mixture comprising the metallic precursor compound and the activator precursor compound.

13. The method of claim 4, wherein the amount of the flux is in the range of about 0.001 to about 5 parts by weight, based on 100 parts by weight of the mixture comprising the metallic precursor compound and the activator precursor compound.

14. The method of claim 1, further comprising milling, washing, drying and classifying the sintered milled product.

15. A halophosphate phosphor represented by Formula 1:

$$(Sr_{5-(x+y)}A_xM'_y)(PO_4)_3Cl.(M_2O_3)_z \qquad \text{Formula 1}$$

wherein

A is barium or calcium,

M' is an activator and comprises at least one cation selected from the group consisting of $Eu^{2+}$, $Mn^{2+}$, $Sb^{2+}$, $Ce^{3+}$, $Pr^{3+}$, $Nd^{3+}$, $Sm^{3+}$, $Tb^{3+}$, $Dy^{3+}$, $Ho^{3+}$, $Er^{3+}$, $Yb^{3+}$ and $Bi^{3+}$, M is aluminum, yttrium or lanthanum, $0 \leq x \leq 4.8$, $0 < y \leq 0.2$, and $0 \leq z < 0.1$, wherein the halophosphate phosphor is prepared by a method comprising mixing a metallic precursor compound, which comprises strontium pyrophosphate, strontium chloride and strontium carbonate; optionally a metal precursor compound selected from the group consisting of a barium precursor compound, a calcium precursor compound and mixture thereof, and an activator precursor compound to form a mixture;

sintering the mixture under an oxygen or air atmosphere to form a sintered mixture;

mixing the sintered mixture with an aluminum precursor compound, a yttrium precursor compound, a lanthanum precursor compound and mixture thereof;

milling the sintered mixture to form a milled product; and sintering the milled product under a reducing atmosphere.

16. A light emitting device comprising:

a light emitting diode; and a halophosphate phosphor, represented by Formula 1:

$$(Sr_{5-(x+y)}A_xM'_y)(PO_4)_3Cl.(M_2O_3)_z \qquad \text{Formula 1}$$

wherein

A is barium or calcium,

M' comprises at least one cation selected from the group consisting of $Eu^{2+}$, $Mn^{2+}$, $Sb^{2+}$, $Ce^{3+}$, $Pr^{3+}$, $Nd^{3+}$, $Sm^{3+}$, $Tb^{3+}$, $Dy^{3+}$, $Ho^{3+}$, $Er^{3+}$, $Yb^{3+}$ and $Bi^{3+}$, M is aluminum, yttrium or lanthanum, $0 \leq x \leq 4.8$, $0 < y \leq 0.2$, and $0 \leq z < 0.1$, wherein the halophosphate phosphor is prepared by a method comprising mixing a metallic precursor compound, which comprises strontium pyrophosphate, strontium chloride and strontium carbonate; optionally a metal precursor compound selected from the group consisting of a barium precursor compound, a calcium precursor compound and mixture thereof, and an activator precursor compound to form a mixture;

sintering the mixture under an oxygen or air atmosphere to form a sintered mixture;

mixing the sintered mixture with an aluminum precursor compound, a yttrium precursor compound, a lanthanum precursor compound and mixture thereof;

milling the sintered mixture to form a milled product; and sintering the milled product under a reducing atmosphere.

17. A cold cathode fluorescent lamp comprising a halophosphate phosphor represented by Formula 1:

$$(Sr_{5-(x+y)}A_xM'_y)(PO_4)_3Cl \cdot (M_2O_3)_z \quad \text{Formula 1}$$

wherein
- A is barium or calcium,
- M' comprises at least one cation selected from the group consisting of $Eu^{2+}$, $Mn^{2+}$, $Sb^{2+}$, $Ce^{3+}$, $Pr^{3+}$, $Nd^{3+}$, $Sm^{3+}$, $Tb^{3+}$, $Dy^{3+}$, $Ho^{3+}$, $Er^{3+}$, $Yb^{3+}$ and $Bi^{3+}$,
- M is aluminum, yttrium or lanthanum,
- $0 \leq x \leq 4.8$,
- $0 < y \leq 0.2$, and
- $0 \leq z < 0.1$,
- wherein the halophosphate phosphor is prepared by a method comprising mixing a metallic precursor compound, which comprises strontium pyrophosphate, strontium chloride and strontium carbonate; optionally a metal precursor compound selected from the group consisting of a barium precursor compound, a calcium precursor compound and mixture thereof, and an activator precursor compound to form a mixture;

sintering the mixture under an oxygen or air atmosphere to form a sintered mixture;

mixing the sintered mixture with an aluminum precursor compound, a yttrium precursor compound, a lanthanum precursor compound and mixture thereof;

milling the sintered mixture to form a milled product; and sintering the milled product under a reducing atmosphere.

* * * * *